United States Patent
Ido et al.

(10) Patent No.: US 7,266,118 B2
(45) Date of Patent: Sep. 4, 2007

(54) PACKET RECEIVING APPARATUS AND PACKET TRANSMISSION METHOD

(75) Inventors: Daiji Ido, Yokohama (JP); Koji Imura, Machida (JP); Akihiro Miyazaki, Sakai (JP); Koichi Hata, Katano (JP); Carsten Burmeister, Darmstadt (DE)

(73) Assignee: Matsushita Electric Industrial Co., Ltd., Osaka (JP)

( * ) Notice: Subject to any disclaimer, the term of this patent is extended or adjusted under 35 U.S.C. 154(b) by 984 days.

(21) Appl. No.: 10/143,989

(22) Filed: May 14, 2002

(65) Prior Publication Data

US 2002/0172201 A1   Nov. 21, 2002

(30) Foreign Application Priority Data

May 16, 2001   (JP)   ............................. 2001-146281

(51) Int. Cl.
   *H04L 12/22*   (2006.01)
(52) U.S. Cl. ....................... 370/389; 370/474
(58) Field of Classification Search .................... None
   See application file for complete search history.

(56) References Cited

U.S. PATENT DOCUMENTS

| 5,293,379 | A | 3/1994 | Carr |
| 6,032,197 | A | 2/2000 | Birdwell et al. |
| 6,609,224 | B1* | 8/2003 | Jonsson ..................... 714/758 |
| 6,754,231 | B1* | 6/2004 | Jonsson et al. ............. 370/474 |
| 2002/0071432 | A1* | 6/2002 | Soderberg et al. .......... 370/389 |

FOREIGN PATENT DOCUMENTS

| EP | 1137237 | 9/2001 |
| JP | 01177731 | 7/1989 |
| JP | 08331103 | 12/1996 |
| WO | 0079763 | 12/2000 |

OTHER PUBLICATIONS

RFC2508-Compressing IP/UDP/RTP Headers for Low-Speed Serial Links, Feb. 1999, pp. 1-15.
RFC30905-RObust Header Compression (ROHC): Framework and four profiles: RTP, UDP, ESP, and uncompressed, Jul. 2001, pp. 1-100.

(Continued)

*Primary Examiner*—Huy D. Vu
*Assistant Examiner*—Robert W. Wilson
(74) *Attorney, Agent, or Firm*—Stevens, Davis, Miller & Mosher, LLP

(57) ABSTRACT

A packet receiving method may include receiving a packet having either a compressed header or a noncompressed header. A packet received with a compressed header is decompressed to regenerate a non-compressed header for the packet. Error detection is performed to detect the presence of an error in a packet: (1) received with a noncompressed header, (2) having a regenerated non-compressed header, or (3) having a replacement non-compressed header. Part of the non-compressed header, in a packet having a regenerated non-compressed header, is replaced with previously stored non-compressed header information, which is known to be correct, when an error is detected in the packet so as to produce a replacement non-compressed header. A packet is output as a correctly received packet when no error is detected in the packet.

8 Claims, 9 Drawing Sheets

OTHER PUBLICATIONS

Japanese Office Action with English translation dated Jun. 3, 2003.
European Search Report dated Sep. 16, 2002.
K. Svanbro, et al.: "Wireless Real-time IP Services Enabled by Header Compression", VTC 2000-Spring, 2000 IEEE 51st. Vehicular Technology Conference Proceedings, Tokyo, Japan, May 15-18, 2000 IEEE Vehicular Technology Conference, New York, NY: IEEE, US, vol. 2 of 3 Conf. 51, May 15, 2000, pp. 1150-1154, XP002164596, ISBN: 0-7803-5719-1.

* cited by examiner

| PACKET | SEQUENCE NUMBER | SEQUENCE NUMBER TO TRANSMIT |
|---|---|---|
| 1 | 0000 0000 0000 0001 | 0000 0000 0000 0001 |
| 2 | 0000 0000 0000 0010 | 0010 |
| 3 | 0000 0000 0000 0011 | 0011 |
| 4 | 0000 0000 0000 0100 | 0100 |
| 5 | 0000 0000 0000 0101 | 0101 |
| ... | ... | ... |
| 16 | 0000 0000 0001 0000 | 010000 |
| 17 | 0000 0000 0001 0001 | 0001 |

FIG.2

PACKET RECEIVING APPARATUS AND PACKET TRANSMISSION METHOD

BACKGROUND OF THE INVENTION

1. Field of the Invention

The present invention relates to a packet receiving apparatus and packet transmission method used for packet transmission, and more particularly to a packet receiving apparatus and packet transmission method that decompress headers that have been compressed and transmitted.

2. Description of the Related Art

Among the most common protocols (communication procedures) presently used to transmit packets on the Internet are the RTP (Real-time Transport Protocol), UDP (User Data Protocol), and IP (Internet Protocol). In packet transmission, these protocols are commonly used in combination, and besides, these protocols have been standardized by the IETF (Internet Engineering Task Force).

In each of the above protocols, information is added as described below to transmission data for a header to form a packet. That is, by RTP, a sequence number (hereinafter "SN" when necessary), which denotes the order of data, and time stamp (hereinafter "TS" when necessary), which is the time information, are added to data to form an RTP packet.

Next, by UDP, the port number of the receiving side is added to an RTP packet to form a UDP packet. Furthermore, by IP, the Internet address (IP address) of the receiving side is added to a UDP packet to form an IP packet. The IP packet is transmitted to the receiving side.

Of these headers added by RTP, UDP, and IP, the TS and SN vary every time a packet is transmitted and therefore are dynamic information, whereas the rest of information is static information (STATIC information) that becomes constant once transmission begins.

A header like this is given for each protocol, and so when several protocols are used in communication, the header portion becomes long and the packet transmission rate decreases. For this reason, there are header compression methods that compress the header and then transmit a packet to improve the packet transmission rate.

The compression method for each header added by RTP, UDP, and IP is prescribed by the IETF in RFC (Request for Comments) 2508. The header compression methods prescribed in RFC2508 are principally for packet transmission on a wired network such as the Internet.

In contrast, one header compression method presently proposed by the IETF for wireless packet transmission such as used in a cellular phone network is the ROHC (RObust Header Compression). This header compression method, noting that the rate of error occurrence tends to be higher in a wireless network than in a wired network, features a high error resiliency for the errors that occur during transmission.

Also, because the band frequency that a wireless network can make use of is narrower than that of a wired network, ROHC sets a higher header compression rate than the compression methods prescribed in RFC2508. ROHC is prescribed by the IETF in RFC 3095.

In ROHC, there are two types of headers as shown in FIGS. 1(a) and (b), each respectively refereed to as the non-compressed (IR) packet and compressed (SO) packet. The header of an IR packet shown in FIG. 1(a) contains parameters that do not vary in the course of communication (IP addresses, port numbers, etc.: static information), parameters that vary in the course of communication (SN, TN, etc.), and CRC (Cyclic Redundancy Check) bits that check as to whether the header, when decompressed on the receiving side, has been correctly decompressed.

The static information, SN, and TN are often transmitted at predetermined intervals. The compressed packet shown in FIG. 1(b) does not contain an IP address, port number, TS, and Δ TS (TS increase), but contains a compressed sequence number (hereinafter "SN'" when necessary) and CRC bits. The SN' is indicated with lower several bits of the original 16-bit SN.

To be specific, ROHC compresses a header as follows. That is to say, a non-compressed header containing an IP address and port number is not transmitted by every transmission unit, but is transmitted at predetermined intervals. When a consistent pattern appears between the SN increase and TN increase, the SN alone is transmitted, and the TS increase is calculated from the SN increase on the receiving side.

With respect to the SN, furthermore, only lower several bits are transmitted in an SO packet, and only when a carry occurs the complete bits of an SN is transmitted. In this case, the transmitting side compresses a header with reference to referential information called context, whereas the receiving side decompresses the header by using the same context as the one used by the transmitting side. The referential information here indicates previously transmitted header information.

To be more specific, the method for generating an SN' by selecting the lower bits of an SN will be explained in detail with FIG. 2. First, because it is not possible to transmit only the lower bits in packet 1, a complete SN of 16 bits "0000 0000 0000 0001" is transmitted in an IR packet. Following this, the transmitting side transmits in sequence packet 2 and packet 3. However, because the upper bits (bit 1 to bit 12) do not vary between neighboring packets, only the lower 4 bits (bit 13 to bit 16) are transmitted. By making reference to the context, the receiving side can regenerate the correct 16-bit SN using only the lower 4 bits.

For instance, in case of packet 2, only the lower 4 bits "0010" are transmitted. The receiving side, determining that the remaining upper 12 bits do not vary from packet 1, restores the SN to "0000 0000 0000 0010." Since the CRC is added to every compressed packet, it is possible to check whether are stored header is a correct header.

Also, in the transmission of a packet 17, a carry occurs and the lower 5th bit changes from 0 to 1. As a result of this, the transmission cannot be correctly performed with only the lower 4 bits. So the packet 17 will transmit, for instance, the lower 6 bits "010000" of the SN, by which means the receiving side can regenerate the correct 16-bit SN.

Packet transmission using the ROHC will be explained with FIGS. 3 and 4. FIG. 3 is a block diagram showing the configuration of a conventional packet receiving apparatus. FIG. 4 is a sequence diagram showing the procedures of conventional packet transmission and reception.

First, as FIG. 4 shows, the transmitting side (the compressing side) transmits an IR packet containing static information, TS, SN, and CRC bits. Subsequently, an SO packet containing the lower bits SN' of an SN and CRC bits are transmitted in succession. If the static information is not correctly received, the following information cannot be correctly received either. However, this can be prevented by transmitting an IR packet on a regular basis.

In the packet receiving apparatus shown in FIG. 3, predetermined radio receiving processing (for instance, down-conversion, A/D conversion, etc.) of a signal received via an antenna 601 takes place in receiving section 602, followed by a demodulation process of the signal after the radio receiving process. A packet subjected to the demodulation process is output to a header decompressing section 603, and the header is decompressed in the header decompressing section 603. With respect to the decompression of the header, as described above, the decompressing section 603 decompresses a compressed sequence number SN' with reference to the context which is stored in a buffer 606 and which is the information of previously transmitted packets. More specifically, on the decompressing side (the receiving side), an SN is regenerated from an SN' (the lower bits of an SN), the value of the TS (Time Stamp) contained in an RTP header is calculated from the SN, and an RTP header, UDP header, or IP header is reproduced from the static information, SN, and TS.

A packet containing a decompressed header is output to CRC section 604, and an error detection by CRC is performed in CRC section 604. When no error is detected by CRC, the packet is output as a received packet. Meanwhile, following the instructions from a context updating section 605, the contents of a buffer 606 is updated to the context of the received packet, that is to say, the header.

Thus, while the SN' contains only the lower bits of an SN, because the upper bits have already been received on the decompressing side, an SN can be prefigured from the SN value of a reproduced packet, and therefore the entire SN can be regenerated. Even when this prefiguration fails, there generation of a false SN, which can be detected by CRC check, can be prevented.

A case that a bit error occurs in the header portion will be described next with FIG. 5. As FIG. 5 shows, when a bit error occurs in compressed packet 4 (SO), the bit error will be detected in the compressed packet 4 if a CRC detection is normally performed after the header has been decompressed on the decompressing side. It is then determined that an error has occurred in the header portion or in CRC bits, and the compressed packet 4 will be discarded.

Next a case of a bit error in an IR packet will be described with FIG. 6. As FIG. 6 shows, when an IR packet 6 is received, CRC is used to perform a bit error detection on the header of the IR packet. If a bit error is detected, the packet 6 will be discarded.

However, as FIG. 6 shows, the following problem exists when a packet is discarded in case of a bit error in an IR packet. That is to say, if a bit error is detected, this means that a bit error exists in any one or more of the static information, SN', and CRC bits. Because of this, even when an error occurs in the static information alone (the non-compressed portion) and even when thus an SN' is correctly received, the whole packet is discarded based on CRC results.

SUMMARY OF THE INVENTION

An object of the present invention is to provide a packet receiving apparatus and packet transmission method enabling a packet to be received correctly when an error occurs in the non-compressed portion without discarding the packet.

CRC bits contained in the header of a non-compressed packet or compressed packet will detect an error when a bit error occurs in the header and discard the packet. However, in case of a non-compressed packet, even when an error occurs in the static information (the portion that does not vary in the course of communication) such as the transmitter's IP address, the packet will be discarded if an error is detected by CRC.

This is because a packet is discarded on the sole basis of CRC results, without distinguishing the compressed portion (SN, for instance) and non-compressed portion (static information). Focusing on this problem, the present inventors have arrived at the present invention which can determine whether the compressed portion has been correctly received, by utilizing the static information stored in a buffer as the context, and by regenerating a received packet with the static information that has already been correctly received and then performing CRC again.

The present invention achieves the object by, when a transmission bit error occurs in the static information and the header is not correctly received, checking for errors once again using the already-received static information, by determining as to whether the compressed portion has been correctly received (determining that a bit error has occurred only in the static information, in case no bit error is detected) and by receiving the packet in which a bit error has occurred.

BRIEF DESCRIPTION OF THE DRAWINGS

The above and other objects and features of the invention will appear more fully hereinafter from a consideration of the following description taken in connection with the accompanying drawing wherein one example is illustrated by way of example, in which;

FIG. 2 is a diagram showing an example of the compression of a sequence number;

DETAILED DESCRIPTION OF THE PREFERRED EMBODIMENTS

With reference now to the accompanying drawings, embodiments of the present invention will be explained in detail below.

With this embodiment a case will be described (here) where CRC is repeated by reading the already correctly received static information from a buffer when a bit error is detected by CRC in a packet that has been received in a packet receiving apparatus, to determine as to whether the compressed portion has been correctly received.

Figure 1:
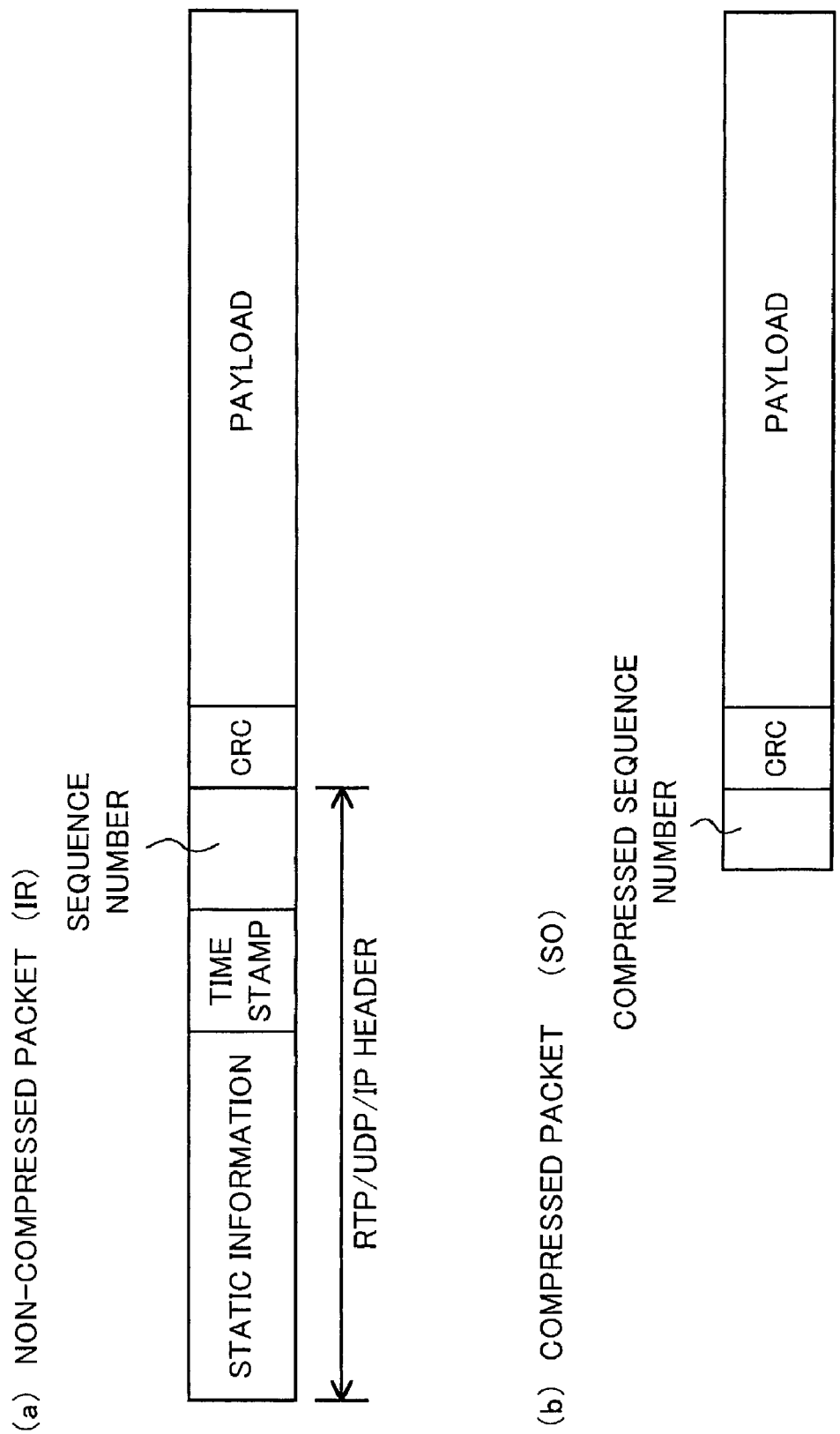
FIG. 1 is a frame format showing a configuration of a packet.
Figure 3:
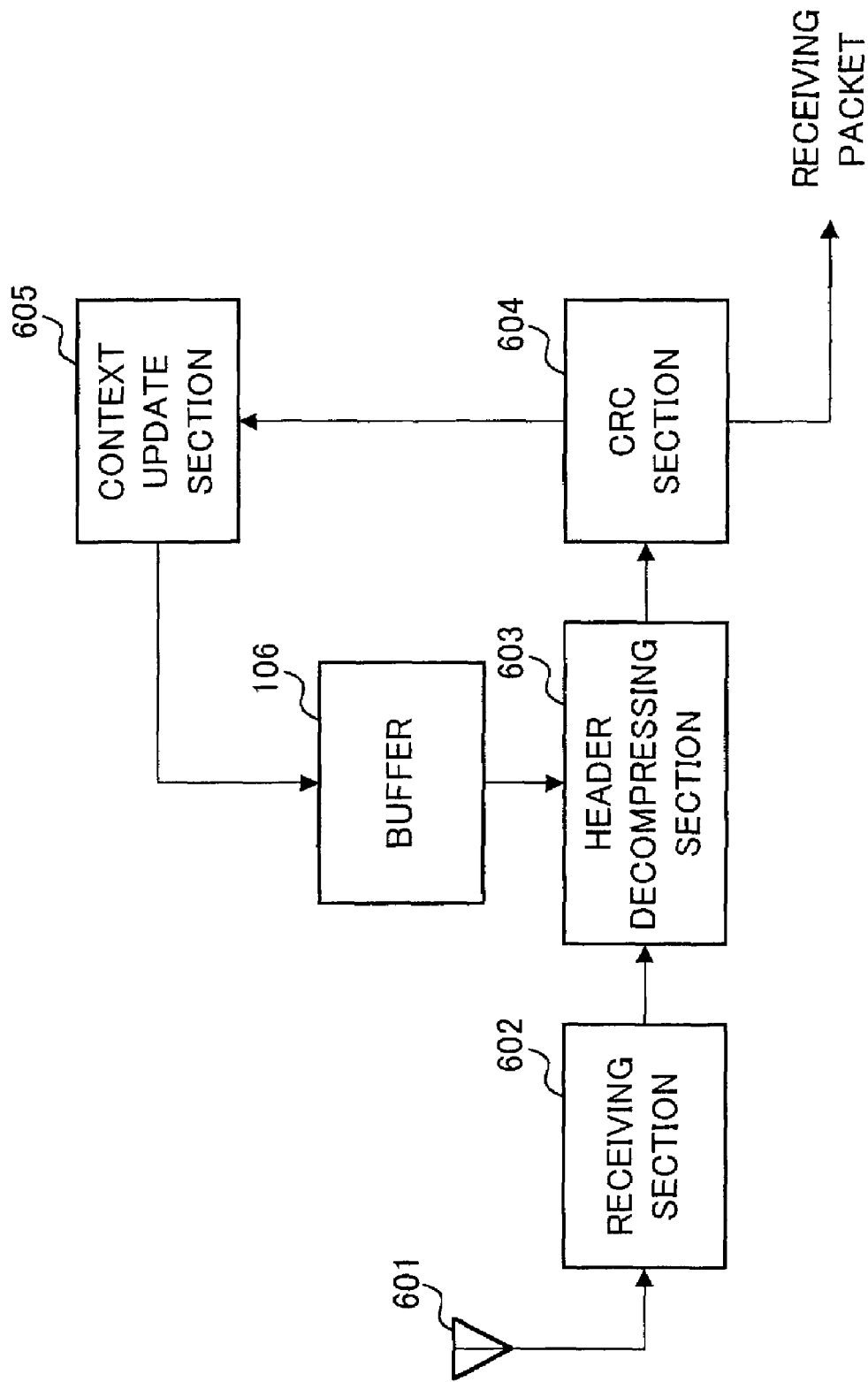
FIG. 3 is a block diagram showing the configuration of a conventional packet receiving apparatus.
Figure 4:
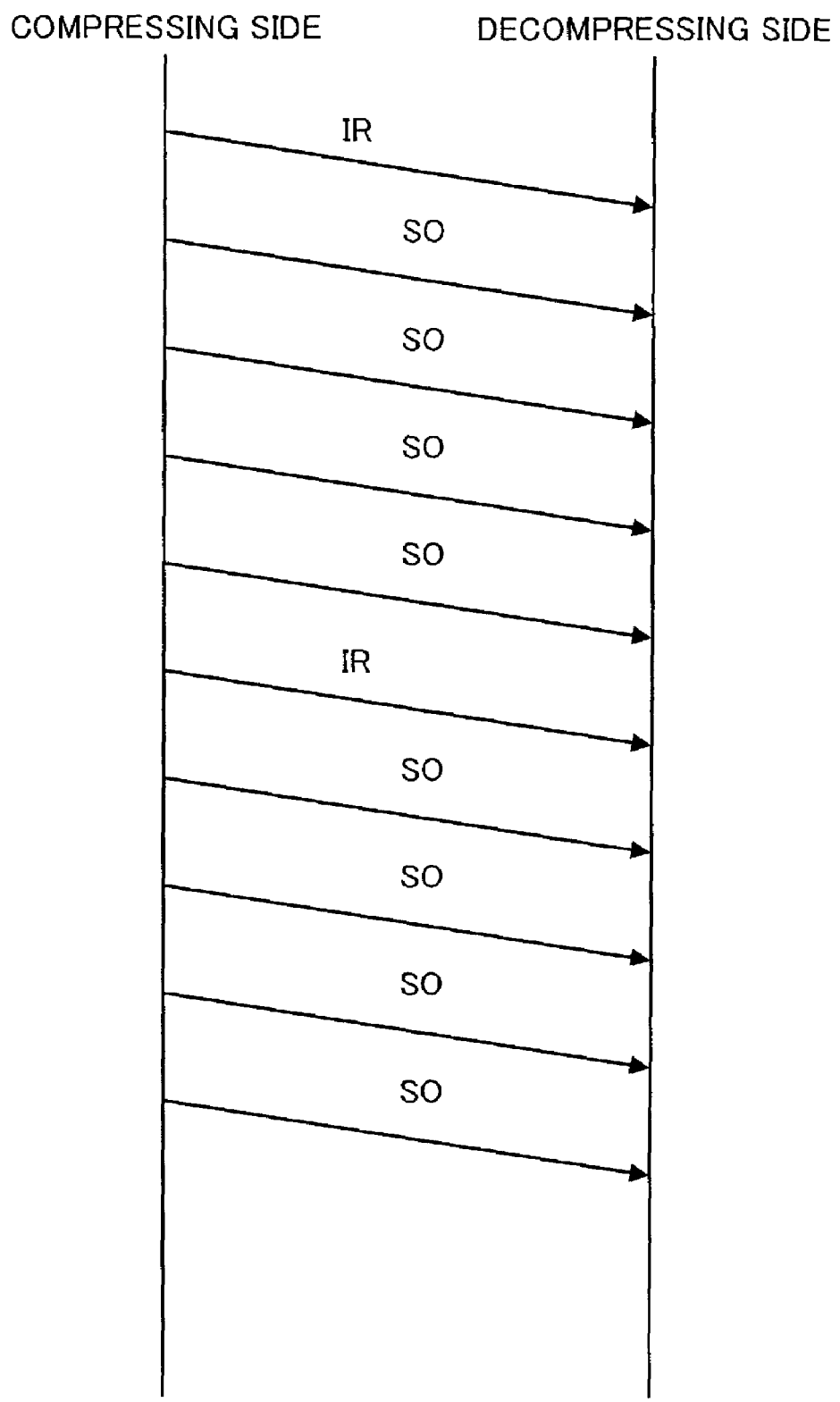
FIG. 4 is a sequence diagram used to explain the process of packet transmission/reception.
Figure 5:
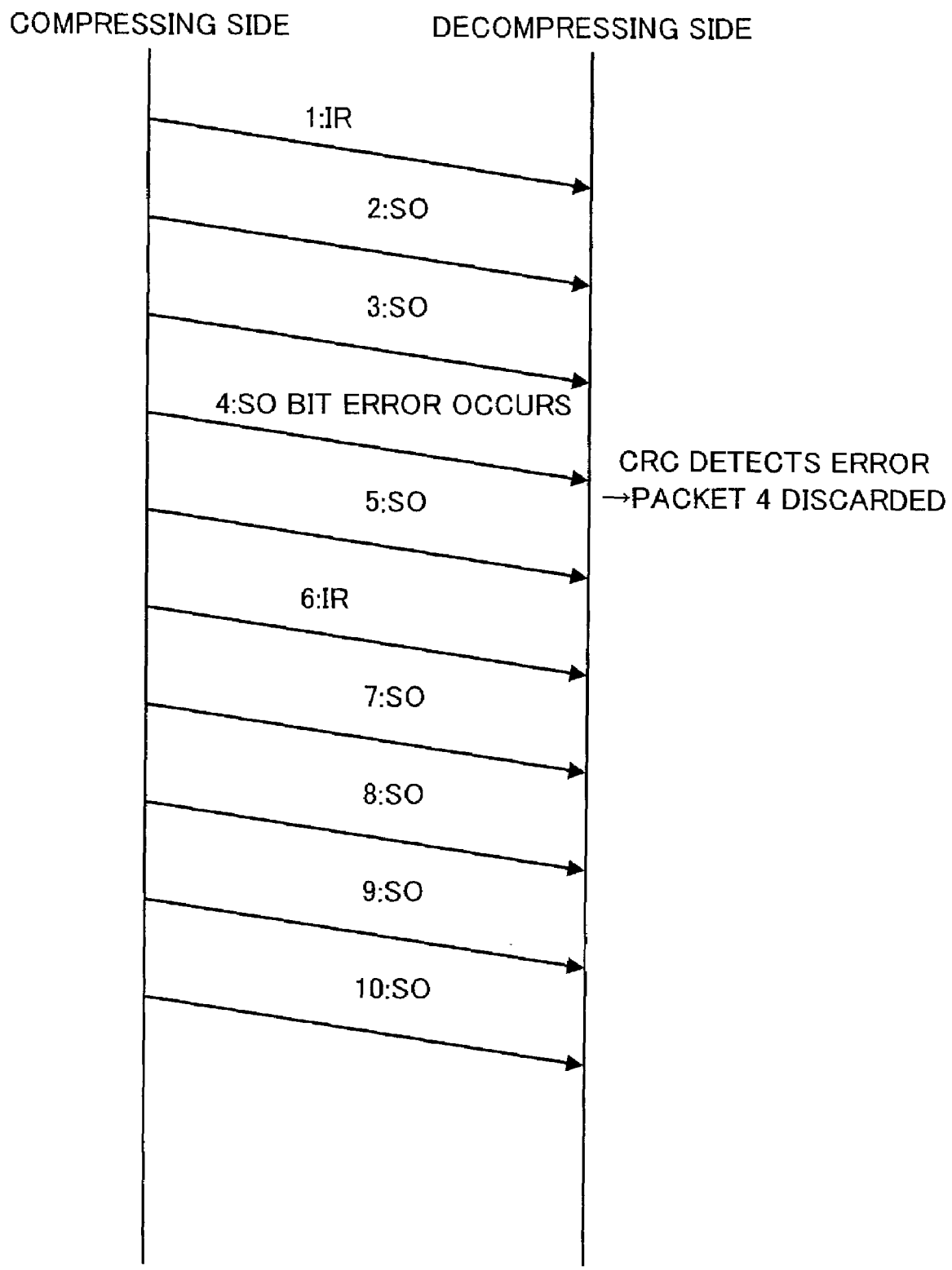
FIG. 5 is a sequence diagram used to describe a case where an error occur in a compressed packet during the conventional process of packet transmission/reception.
Figure 6:
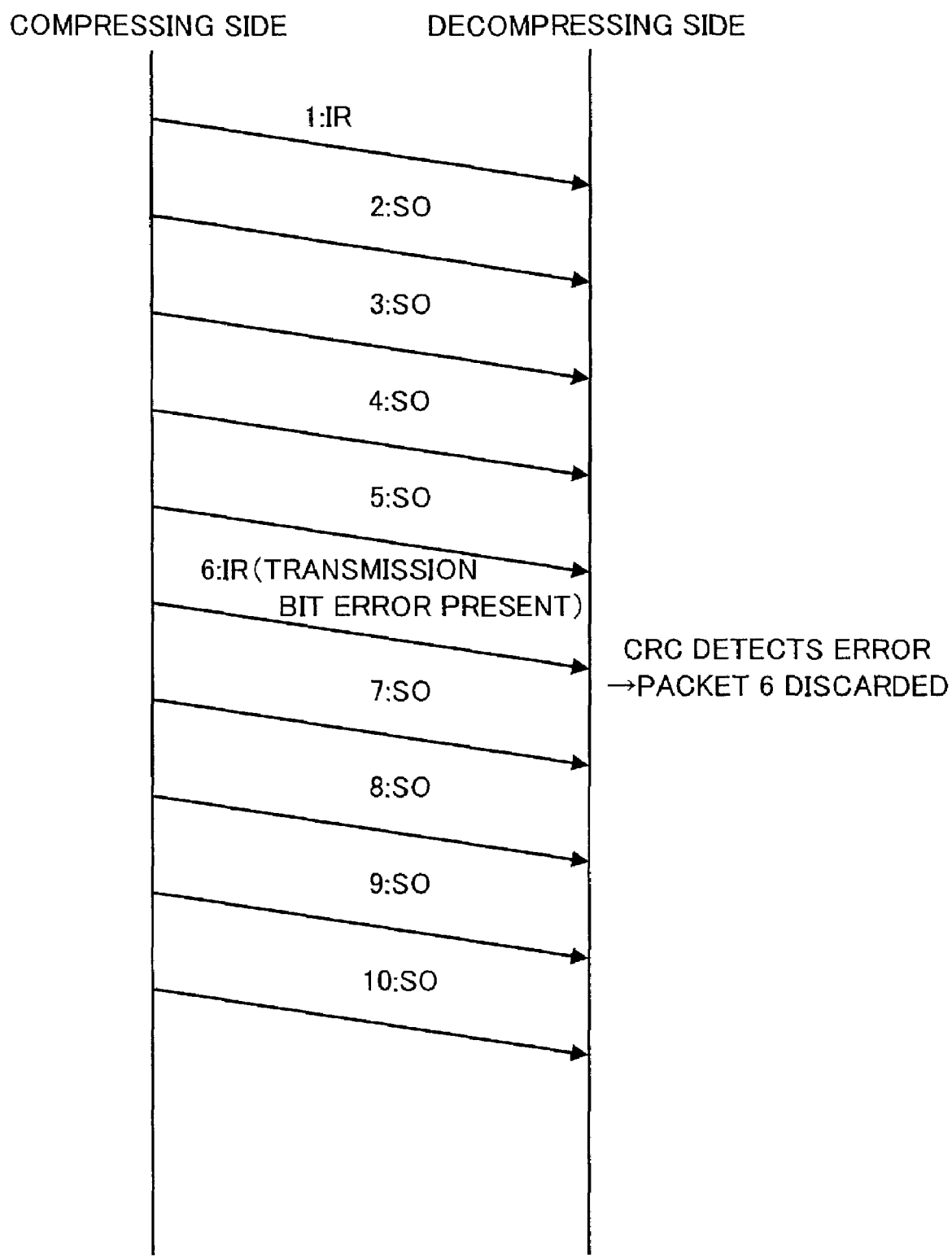
FIG. 6 is a sequence diagram used to describe a case where an error occurs in a non-compressed packet during the conventional process of packet transmission/reception.
Figure 7:
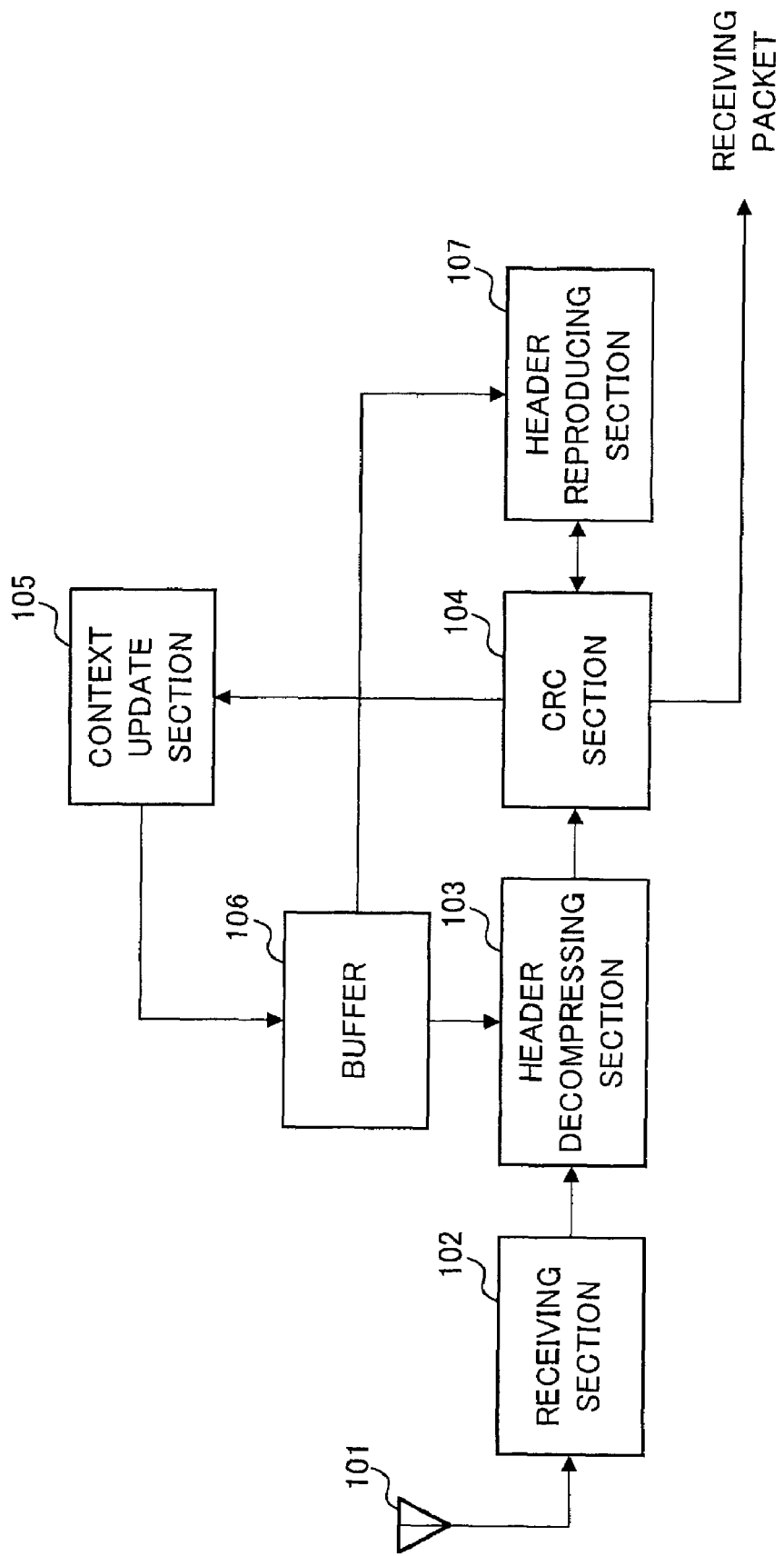
FIG. 7 is a block diagram showing the configuration of a packet receiving apparatus according to an? embodiment of the present invention.

FIG. 7 is a block diagram showing the configuration of a packet receiving apparatus according to this embodiment of the present invention. A case will be described here where a packet is transmitted via a wireless channel.

Receiving section 102 performs predetermined radio receiving processing (down-conversion, A/D conversion, etc.) on a packet received via an antenna 101, and demodulates the signal subjected to the radio receiving processing. The demodulated received packet is output to header decompressing section 103.

The header decompressing section 103 decompresses a header of the received packet with reference to the context stored in the buffer 106 and outputs a packet with the decompressed header to CRC section 104. CRC section 104 performs CRC on the header of the packet output from the header decompressing section 103 and outputs the packet subjected to CRC as a received packet. Further, the CRC section 104, when CRC detects no error, commands a context updating section 105 to update the context. The context updating section 105, following the instructions of the CRC section 104, updates the context stored in the buffer 106.

The header reproducing section 107, when informed that an error has been detected from the CRC section 104, by replaces the static information of a received packet with the static information stored in the buffer 106 to reproduce a packet, and then outputs the reproduced packet to the CRC section 104.

Figure 8:
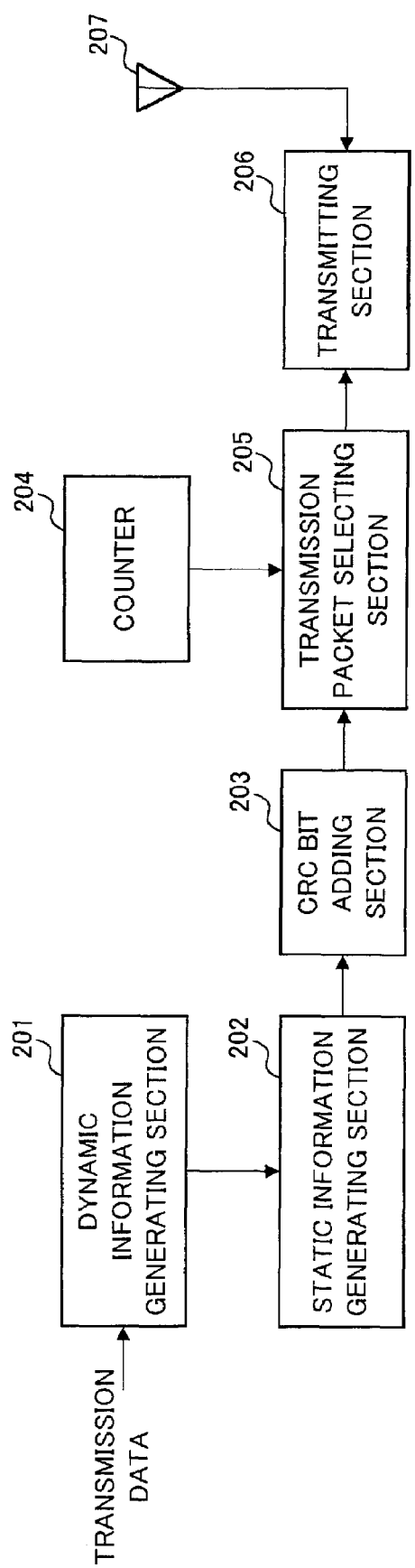
FIG. 8 is a block diagram showing the configuration of a packet transmitting apparatus that performs wireless communications with a packet receiving apparatus according to an embodiment of the present invention.

FIG. 8 is a block diagram showing the configuration of a packet transmitting apparatus that performs wireless communications with a packet receiving apparatus according to an embodiment of the present invention. This packet transmission apparatus transmits static information periodically.

In the packet transmitting apparatus shown in FIG. 8, a dynamic information generating section 201 generates data-related dynamic information such as the TS and SN. A static information generating section 202 generates static information such as IP addresses and port numbers. These dynamic information and static information are output to a CRC bit adding section 203.

CRC bit adding section 203 adds CRC bits to the header information that includes both static information and dynamic information, and outputs a signal, to which CRC bits have been added, to a packet selecting section 205.

The transmission packet selecting section 205, when the number in a counter 204 that keeps count the number of times a packet has been transmitted exceeds the predetermined number, selects an IR packet and generate a transmission packet to reset the counter 204. On the other hand, if the number in the counter is lower than the predetermined number, the transmission packet selecting section 205 selects an SO packet and generates a transmission packet. If an SO packet is selected, the header compression described with embodiment 1 will be performed.

A transmission packet is output to a transmitting section 206 and after performing a modulation process and prescribed radio transmission processing (D/A conversion, up-conversion, etc.) will be transmitted via an antenna 207.

In this configuration, an IP packet containing static information is transmitted periodically, so that, even when an IR packet fails to be received, a packet can be received correctly as long as a subsequent IR packet is received correctly.

Next a packet transmission method which uses a packet receiving apparatus of the above configuration will be described with FIGS. 7 to 9. In the case described here the SN is 16 bits, but the SN is not limited to 16 bits.

First, the transmitting side transmits an IR packet containing static information generated in a static information generating section 202, a TS and SN generated in a dynamic information generating section 201, and CRC bits, and thereafter transmits an SO packet containing a compressed SN' and CRC bits. The IR packet and SO packet are selected in the transmission packet selecting section 205. The IR packet will be transmitted periodically if the count in the counter 204 exceeds the predetermined number.

In the transmission of an IR packet, it is desirable to reduce with time the frequency of IR packet transmission. That is to say, based on the assumption that in the early stages of communication there are few apparatuses that correctly receive an IR packet, the frequency of transmitting an IR packet is set to be comparatively high at this stage, whereas later in time, when there are more apparatuses to correctly receive an IR packet, the frequency of transmitting an IR packet is set low. By this means, the frequency of transmitting an IR packet decreases with time, which makes it possible to improve the transmission rate. This control is made possible by making the number in the counter 204 higher with time.

With respect to an SN in the transmission of an IR packet, as FIG. 2 shows, because it is not possible to transmit the lower bits only in packet 1, a complete SN of 16 bits "0000 0000 0000 0001" is transmitted in an IR packet. Following this, the transmitting side transmits in sequence packet 2 and packet 3. However, because the upper bits (bit 1 to bit 12) do not vary between neighboring packets, only the lower 4 bits ("0010" in packet 2 and "0011" in packet 3) are transmitted.

Packet 1 is received in the packet receiving apparatus shown in FIG. 7 and thereafter subjected to CRC in a CRC section 104. If no error is detected in the result of CRC, the packet will be output as a received packet, while being output to a context updating section 105. In addition, the CRC result in the CRC section 104 is output to the context updating section 105.

The context updating section 105, upon receiving the result from the CRC section 104 indicative of no error, stores in a buffer 106 the header of a received packet output from the CRC section 104. By this means, the SN portion is updated with neighboring static information.

With respect to packet 2, after packet 2 is received in the packet receiving section shown in FIG. 7, the header will be decompressed in a header decompressing section 103. That is to say, in packet 2, the lower 4 bits "0000", are transmitted as an SN', and the header decompressing section 103 decompresses the SN' with reference to the context portion stored in the buffer 106. To be specific, from the context portion "0000 00000 0000" and the SN "0010" of the transmission packet, the 16-bit SN "0000 0000 0000 0010" will be regenerated. Subsequently, the TS (time stamp) value contained in an RTP header will be calculated from the SN, and with the static information, SN, and TS, the complete UDP header and IP header will be regenerated.

Packet 2 with thus decompressed header is transmitted to the CRC section 104, and CRC takes place in CRC section 104. If CRC detects an error, packet 2 will be output to a header reproducing section 107 and the header reproducing section 107 (FIG. 9(a)) will be informed that CRC was no good.

In this case, however, it is not known whether an error from CRC is in the compressed portion (the non-static information portion) or in the non-compressed portion (the static information portion). Therefore, the non-compressed portion (the static information portion) is replaced with the correctly received non-compressed portion, and then CRC will be repeated. By this means, if an error is once again detected by CRC, it will be clear that the error from CRC is in the compressed portion (the non-static information portion).

Therefore, if an error is still detected despite the above replacement with the correct static information, the packet will be discarded based on the idea that the error is in the non-compressed portion (SN', for instance) and that the packet may be unusable. If no error is detected after the replacement with the correct static information, a packet will be output as a received packet based on the idea that the error was in the static information and that the packet has been made usable with the replacement of the static information. By this means, it is possible to use a packet that would have been discarded under the conventional method and to thus improve the packet transmission rate.

Figure 9:
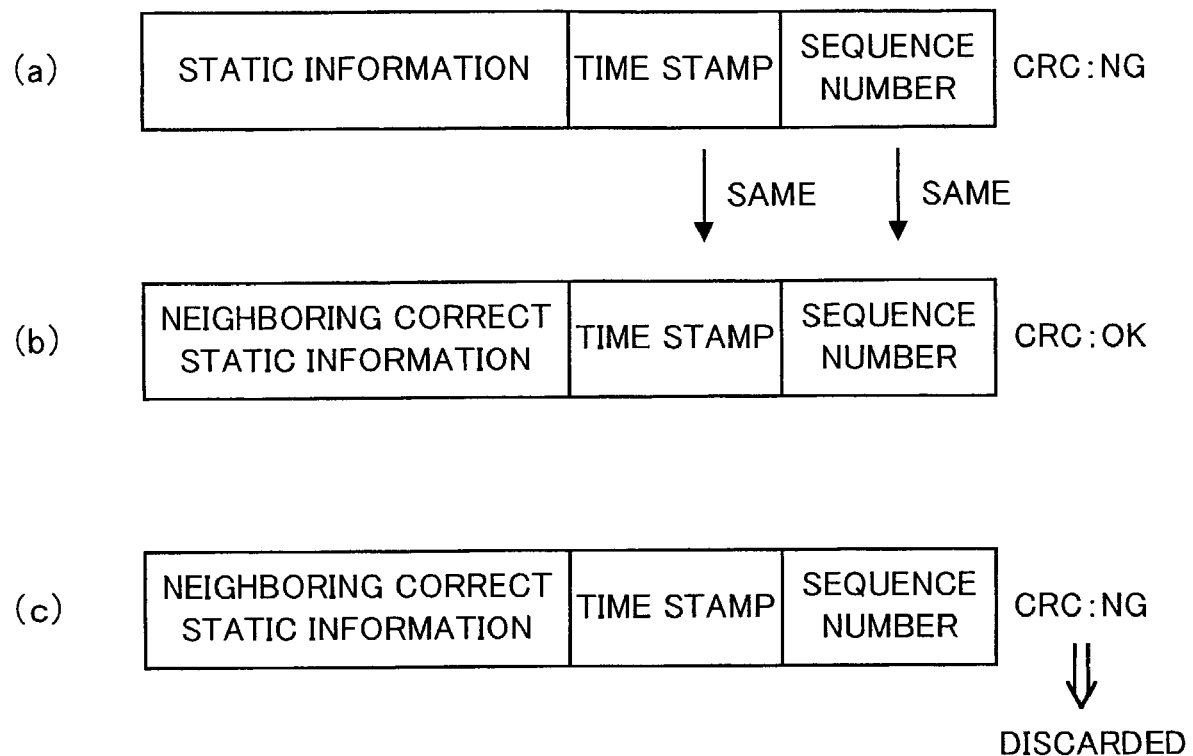
FIG. 9 is a diagram used to describe the operation of a packet receiving apparatus according to an embodiment of the present invention.

To be specific, the header reproducing section 107 extracts the correct static information stored in the buffer 106 and, with this static information, replaces the static information in a packet, shown in FIG. 9(*a*). With the header thus replaced, a packet is output to the CRC section 104. The CRC section 104 then once again performs CRC on a packet in which the static information has been replaced.

If CRC detects no error, a packet will be output to the context updating section 105 as a received packet (FIG. 9.(*b*)) based on the idea that the error was in the static information and that the packet has been made usable with the replacement of the static information. In addition, the result of the repeated CRC will be output to the context updating section 105.

The context updating section 105, upon receiving the result from the CRC section 104 with no error, stores in the buffer 106 the header of a packet output from the CRC section 104. By this means, the SN portion is updated with neighboring static information.

On the other hand, if an error is still detected by CRC, a packet will be discarded (FIG. 9(*c*)) based on the idea that the error is in the compressed portion such as the SN' and that the packet may be unusable even if the static information is replaced.

This embodiment thus clarifies as to in which portion an error has occurred, by replacing the non-compressed portion (the static information portion) with the correctly received non-compressed portion (the static information portion) and by then repeating CRC. In addition, if an error is still detected after the static information has been replaced, the packet will be discarded, whereas if an error is not detected after the static information has been replaced, the packet will be output as a received packet. By this means, it is possible to use a packet that would have been discarded under the conventional method and to improve the packet transmission rate.

Also in this embodiment, in case a carry occurs in packet 16 as shown in FIG. 2, the bit number of the context portion will be changed, thus changing the context portion to "010000" makes it possible to perform packet transmission in the same way as the above.

The present invention is not limited to the above embodiments, is capable of being carried into practice with various modifications thereof. For instance, the above embodiments describe the cases where packet transmission is performed using a packet receiving apparatus and packet transmitting apparatus. However, the present invention is not limited to the above embodiments, and the packet transmission may be performed using software.

For instance, it may be possible to first store a program that performs packet transmission in ROM (Read Only Memory) and then operate the program by CPU (Central Processor Unit).

Another possible way is to store a program that performs the above packet transmission in a computer-readable storage medium, record this program stored in the memory medium to RAM (Read Access Memory) of the computer, and operate the computer in accordance with the program.

In cases like these, the same functions and effects are possible as in the cases of the above embodiments.

The above embodiments describe the cases where the header decompression takes place in the header decompressing section 103 and the header reproduction takes place in the header reproducing section 107. However, it is possible to configure the present invention such that the header decompression and header reproduction take place in the same section.

The packet receiving apparatus and the packet transmitting apparatus that performs wireless communications with the packet receiving apparatus may be applicable to communication terminal apparatuses used in digital wireless communication systems, such as a communication terminal apparatus that performs speech communication and image communication, and a communication relay apparatus that performs speech communication and image communication.

As described above, the present invention clarifies as to in which portion an error has occurred by replacing the non-compressed portion (the static information portion) with the correctly received non-compressed portion (the static information portion) and by then repeating CRC. If an error is still detected after the static information has been replaced, the packet will be discarded, whereas if an error is not detected after the static information has been replaced, the packet will be output as a received packet. By this means, it is possible to make the probability of abandoning data low even when an error occurs through a transmission path with a bit error.

The present invention is not limited to the embodiments described above, and various variations and modifications may be possible without departing from the scope of the present invention.

This application is based on Japanese Patent Application No. 2001-146281, filed on May 16, 2001, the entire contents of which are expressly incorporated by reference herein.

What is claimed is:

1. A packet receiving apparatus comprising:
    a receiver operable to receive a packet having either a compressed header or a non-compressed header;
    a header decompressing section operable to regenerate a non-compressed header for a packet received with a compressed header;
    a buffer operable to store non-compressed header information of a correctly and previously received packet;
    an error detector operable to detect a presence of an error in a packet: (i) received with a non-compressed header, (ii) having a regenerated non-compressed header, or (iii) having a replacement non-compressed header;
    a header replacement section operable to replace part of a non-compressed header with non-compressed header information stored in the buffer when an error is detected in a packet so as to produce a replacement non-compressed header; and
    an updating section operable to update the non-compressed header information stored in the buffer with header information from a packet that has no errors detected therein;
    wherein the error detecting unit outputs a packet as a correctly received packet when no error is detected in the packet.

2. The packet receiving apparatus of claim 1, wherein the part of a non-compressed header is information having a static value for a series of received packets.

3. The packet receiving apparatus of claim 1, wherein:
the non-compressed header includes static and dynamic information;
the header replacement section replaces the static information of the non-compressed header with static information stored in the buffer when an error is detected in a packet having a non-compressed header; and
the error detecting unit discards a packet received with a non-compressed header or having a replacement non-compressed header when an error is detected therein.

4. A packet transmission system comprising:
a packet transmitting apparatus operable to transmit a packet having a non-compressed header and transmit a packet having a compressed header; and
a packet receiving apparatus comprising:
  a receiver operable to receive a transmitted packet having either a compressed header or a non-compressed header;
  a header decompressing section operable to regenerate a non-compressed header for a packet received with a compressed header;
  a buffer operable to store non-compressed header information of a correctly and previously received packet;
  a error detector operable to detect a presence of an error in a packet: (i) received with a non-compressed header, (ii) having a regenerated non-compressed header, or (iii) having a replacement non-compressed header;
    a header replacement section operable to replace part of a non-compressed header with non-compressed header information stored in the buffer when an error is detected in a packet so as to produce a replacement non-compressed header; and
    an updating section operable to update the non-compressed header information stored in the buffer with header information from a packet that has no errors detected therein;
    wherein:
    the non-compressed header includes static and dynamic information;
    the header replacement section replaces the static information of the non-compressed header with static information stored in the buffer when an error is detected in a packet having a non-compressed header; and
    the error detecting unit outputs a packet as a correctly received packet when no error is detected in the packet and discards a packet received with a non-compressed header or having a replacement non-compressed header when an error is detected therein.

5. A packet receiving method comprising:
receiving a packet having either a compressed header or a non-compressed header;
decompressing a packet received with a compressed header to regenerate a non-compressed header for the packet;
storing non-compressed header information of a correctly and previously received packet;
detecting a presence of an error in a packet: (i) received with a non-compressed header, (ii) having a regenerated non-compressed header, or (iii) having a replacement non-compressed header;
replacing part of a non-compressed header with the stored non-compressed header information when an error is detected in a packet so as to produce a replacement non-compressed header;
updating the stored non-compressed header information with header information from a packet that has no errors detected therein; and
outputting a packet as a correctly received packet when no error is detected in the packet.

6. The packet receiving method of claim 5, wherein the part of a non-compressed header is information having a static value for a series of received packets.

7. The packet receiving method of claim 5, wherein:
the non-compressed header includes static and dynamic information;
the static information of the non-compressed header is replaced with the stored
information when an error is detected in a packet having a non-compressed header; and
a packet received with a non-compressed header or having a replacement non-compressed header is discarded when an error is detected therein.

8. A packet transmission method comprising:
transmitting a packet having either a non-compressed header or a compressed header;
receiving the transmitted packet having either a compressed header or a non-compressed header;
decompressing a packet received with a compressed header to regenerate a non-compressed header for the packet;
storing non-compressed header information of a correctly and previously received packet;
detecting a presence of an error in a packet: (i) received with a non-compressed header, (ii) having a regenerated non-compressed header, or (iii) having a replacement non-compressed header;
replacing part of a non-compressed header with the stored non-compressed header information when an error is detected in a packet so as to produce a replacement non-compressed header;
updating the stored non-compressed header information with header information from a packet that has no errors detected therein; and
outputting a packet as a correctly received packet when no error is detected in the packet and discarding a packet received with a non-compressed header or having a replacement non-compressed header when an error is detected therein;
wherein:
the non-compressed header includes static and dynamic information; and
the static information of the non-compressed header is replaced with the stored information when an error is detected in a packet having a non-compressed header.

* * * * *